(12) United States Patent
Emmermann et al.

(10) Patent No.: US 6,431,344 B1
(45) Date of Patent: Aug. 13, 2002

(54) CHECKING DEVICE

(75) Inventors: Marco Emmermann; Stefan Bentlin, both of Berlin; Erich Keil, Reichelsheim; Andreas Rösler, Dietzenbach, all of (DE)

(73) Assignee: GSL Gesellschaft für Service-Leistungen mbH, Main (DE)

( * ) Notice: Subject to any disclaimer, the term of this patent is extended or adjusted under 35 U.S.C. 154(b) by 0 days.

(21) Appl. No.: 09/658,228

(22) Filed: Sep. 8, 2000

(30) Foreign Application Priority Data

Jun. 26, 2000 (DE) .......................... 100 31 025

(51) Int. Cl.[7] .............................................. B65G 47/68
(52) U.S. Cl. ...................................... 198/448; 198/950
(58) Field of Search .................................. 198/448, 950

(56) References Cited

U.S. PATENT DOCUMENTS

| | | | | |
|---|---|---|---|---|
| 3,334,723 A | * | 8/1967 | Reed et al. .............. | 198/448 X |
| 3,666,073 A | * | 5/1972 | Lings et al. ............. | 198/448 X |
| 3,735,853 A | * | 5/1973 | Lingg et al. ............. | 198/448 X |
| 4,033,441 A | * | 7/1977 | Pataki ..................... | 198/448 X |
| 4,789,293 A | * | 12/1988 | Hashimoto et al. ..... | 198/950 X |
| 6,058,159 A | * | 5/2000 | Conway et al. ......... | 198/950 X |

FOREIGN PATENT DOCUMENTS

| | | | | |
|---|---|---|---|---|
| DE | 692 02 457 T2 | | 9/1995 | |
| GB | 2114521 | * | 8/1983 | ................. 198/448 |

* cited by examiner

Primary Examiner—James R. Bidwell
(74) Attorney, Agent, or Firm—Friedrich Kueffner

(57) ABSTRACT

A device for checking objects carried by persons entering an enclosed area, has a checking area, a first transport device transporting objects from a first location outside the checking area into the checking area, and a second transport device transporting objects from a second location outside the checking area into the checking area, wherein the second location is not the first location. This design increases the throughput of persons through such a check point.

10 Claims, 2 Drawing Sheets

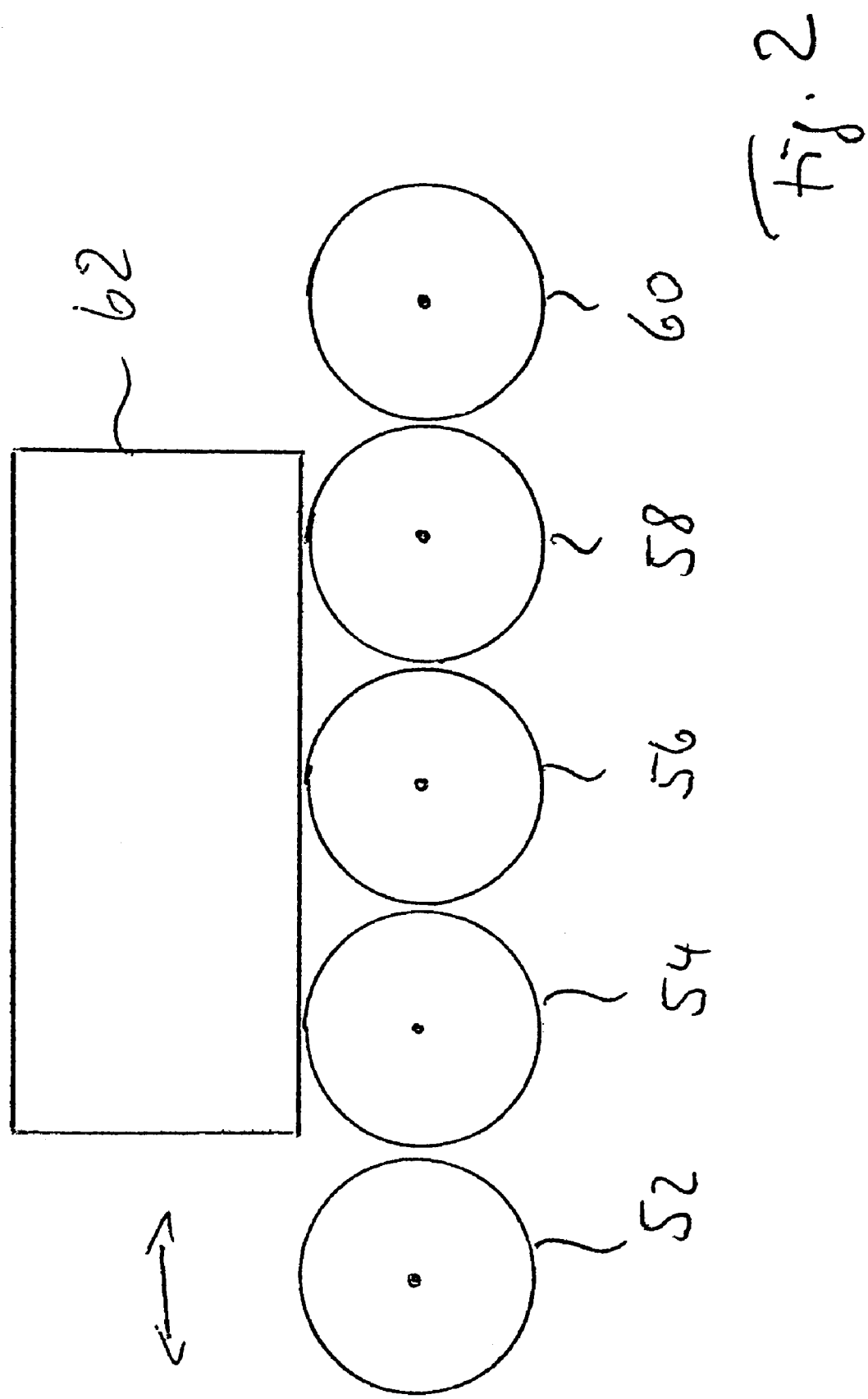

CHECKING DEVICE

BACKGROUND OF THE INVENTION

1. Field of the Invention

The invention relates to a device for checking objects which are carried by persons when entering a closed-off area, wherein the device comprises a checking area and a first transport device for transporting the objects from the first location outside of the checking area into the checking area.

2. Description of the Related Art

Checking devices or check points of the aforementioned kind are known. They are used, for example, in airports in order to check objects, such as carry-on luggage, clothing, cell phones, laptops etc., carried by the passengers when entering the closed-off departure area with respect to bombs, weapons etc. In addition to their use in airports, other applications are also conceivable, for example, in connection with access to public events such as sporting events, concerts etc. Further applications are possible within the area of political conventions but also when entering other security-relevant areas, for example, in industrial corporations, weapons technology corporations, secret service organizations etc.

For reasons of simplification, the following explanations are only directed to the use of the checking device in airports. However, the same holds true also correspondingly for the other applications.

Conventional checking devices of the aforementioned kind have only a single transport device. When entering the departure area of an airport, the passengers are required to place their carry-on luggage, coat, cell phone or laptop etc. onto the transport device whereupon the aforementioned objects are then transported, partly manually, partly motor-driven, into the actual checking area. It was found that the passengers require a relatively long period of time in order to place the objects onto the transport device. For example, it requires some time for the passengers to take off their coats. Further time is required for taking objects to be checked out of pant pockets and to place them onto the transport device. As long as a passenger is occupied with placing the objects to be checked onto the transport device, the following passengers must wait. During this time period, the control area is also not being used because no objects can be guided into it before the aforementioned passenger has not placed them onto the transport device.

Because of this waiting period the throughput of the checking device, i.e., the number of passengers passing through per time unit, is not optimized.

SUMMARY OF THE INVENTION

It is an object of the present invention to further develop a checking device of the aforementioned kind such that the throughput is improved.

In accordance with the present invention, this is achieved in that a second transport device is provided for transporting the objects from a second location, which is also outside of the checking area but does not coincide with the first location, into the checking area.

The invention is based on the surprisingly simple recognition that the time which the passenger needs in order to place the objects to be checked by the checking device onto the transport device can be used to check objects carried by another passenger. Accordingly, not a complete second checking device is being used but only a second transport device is added so that with a minimal expenditure a maximum improvement of the throughput can be obtained.

In this connection, it can be provided according to the invention that the second transport device coincides over a portion thereof with the first transport device. Accordingly, it is not necessary to provide mandatorily a complete further transport path extending into the checking area. It is only required that the two transport devices are separated to such an extent as needed for two persons to place their carried objects at the same time onto the respective transport device, with one being at the aforementioned first location and the other being at the second location.

According to the invention it is especially preferred when the first and the second transport devices are oriented relative to one another in the form of a switch. In other words, the transport paths correlated with the two transport devices are combined after a certain travel distance so that the apparatus expenditure is correspondingly reduced. The transport path, when viewed in a direction counter to the transport direction, is thus branched.

In addition to the first and second transport devices, a third transport device for transporting the objects out of the checking area can be provided according to the invention. It was actually found that the removal of the objects from the transport devices requires substantially less time than the placement of the objects onto the transport devices so that a branching of the transport downstream of the checking area is not necessarily required. However, such a branching is not expressly excluded.

According to the invention it is furthermore preferred that the third transport device is configured such that the objects are transported to a third location which is outside of the checking area but does not coincide with the first or the second location. This makes it possible that the persons which collect the already checked objects will not hinder or disturb those persons which are placing or have just placed their objects onto the first or the second transport device for the purpose of checking.

In this connection it is furthermore preferred that the checking area is a transfer lock and the first and the second locations, viewed in the transport direction, are positioned upstream of the transfer lock while the third location is positioned downstream of the transfer lock. This provides a quasi "oriented" movement of the persons and of the objects to be checked which results in an especially smooth operation of the entire checking process.

According to the invention, the first, the second and/or the third transport device preferably comprises rollers which are supported so as to be rotatable about horizontal axes which rollers are arranged such that the objects placed onto the rollers are movable in the transport direction. An object placed onto these rollers can thus be transported or moved with minimal force expenditure toward the checking area.

The checking area can in principle be of any suitable kind. According to the invention, it is however preferred that the checking area is an X-ray device. According to this embodiment, the objects to be checked are penetrated by X-rays and a corresponding image is displayed on a monitor. The image on the monitor is then checked by a security specialist for the presence of suspicious objects.

In particular in the case of employing X-rays in the checking area, but also for other types of checking, it is preferred according to the invention that at least a portion positioned within the checking area of the first, the second and/or the third transport device is motor-driven. This achieves two things. On the one hand, in regard to the transport of the objects to be checked, it is not required to manually move the objects, which is important with respect to possible health risks as a result of the X-rays. On the other hand, with the motor drive an optimal transport speed can be selected for the checking step in the checking area, which is not necessarily the case when the objects are manually moved through the checking area.

The motor-driven part of the first, the second and/or the third transport device can in principle be designed as desired. Possible is, for example, a motor drive for the above-mentioned rollers. According to the invention it is preferred that the motor-driven portion of the first, second and/or third transport device has a transport belt. Such a transport belt has in particular the advantage that the objects transported thereon are carried safely.

BRIEF DESCRIPTION OF THE DRAWING

In the drawing:

FIG. 2 shows schematically a roller table for use in the device according to FIG. 1.

DESCRIPTION OF THE PREFERRED EMBODIMENTS

Figure 1:
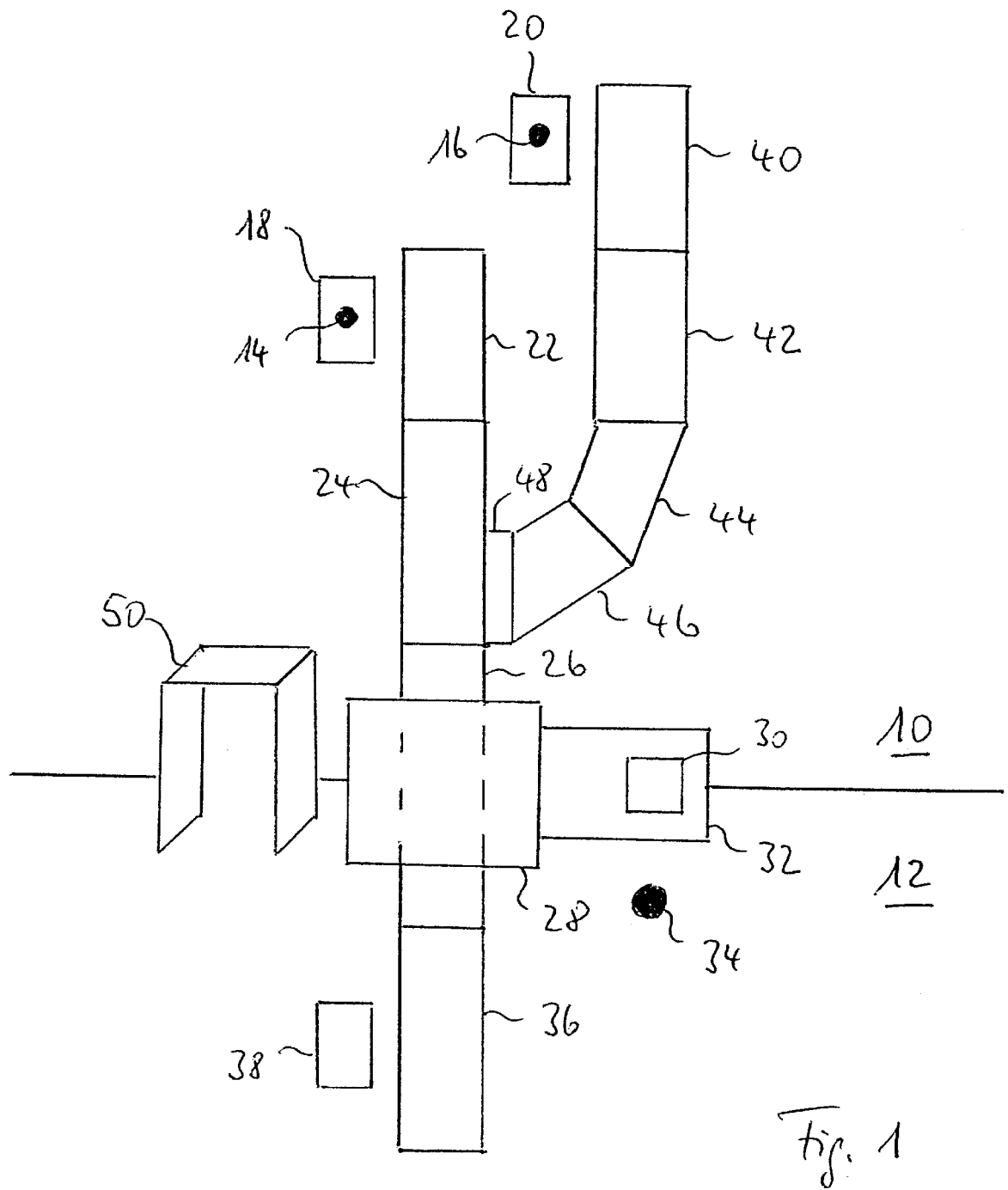
FIG. 1 shows schematically an especially preferred embodiment of the checking device according to the invention.

The checking device illustrated in the drawing is designed especially for use in airports. It is positioned at the interface between a common access hall 10 of the airport and an otherwise closed-off departure hall 12. In the drawing a first passenger 14 and a second passenger 16 are schematically indicated by dots. They are at the first location 18 and the second location 20, respectively. The first passenger 14 places the carried objects, such as carry-on luggage, coat, cell phone, laptop onto a roller table 22 having rollers that are supported so as to rotate about horizontal axes. With the aid of the rollers, the aforementioned objects can be transported by being slightly pushed in the downward direction (as regards the drawing).

A motor-driven transport belt 24 is provided adjoining the roller table 22 for transporting the aforementioned objects farther. The objects are transferred by the transport belt 24 onto a transport belt 26 with which they are transported through a checking area represented by an X-ray transfer lock 28.

An X-ray image generated by the X-ray transfer lock 28 of the objects transported therethrough is displayed on the monitor 30 which is positioned on a table 32. The image on the monitor is checked by a security specialist with respect to the presence of suspicious objects. The security specialist is indicated in the drawing by the dot 34.

Downstream of the transport belt 26 a roller table 36 is positioned on which the checked objects can be transported by manually pushing them until they are picked up at the location 38 by the passenger.

Within the reach of the location 20 a roller table 40 is provided onto which the person 16 can place carried objects. Downstream of the roller table 40 transport belts 42, 44, 46, 48 are provided for further transport of the objects wherein the transport belt 48 moves the objects onto the transport belt 24. From the transport belt 24 the objects are then transported via the transport belt 26 through the lock 28 and to the roller table 36.

To the left of the checking area 28 a metal detector gate 50 is provided.

FIG. 2 show schematically a roller table. It comprises several rollers 52 through 60 whose axes are parallel to one another and positioned horizontally. A schematically indicated object 62 can be effortlessly transported thereon because the rollers 52–60 are rotatably supported on their respective axes in a substantially friction-free way. For a wider roller table it is possible to employ several rollers arranged adjacent to one another in the axial direction. The rollers can also be motor-driven.

The function of the checking device according to the invention illustrated in the drawing is as follows.

The objects placed onto the roller tables 22 and 40 by the persons 14 and 16 are all moved to the transport belt 26 and are subsequently transported through the X-ray transfer lock 28. The objects travel on different paths until they reach the X-ray lock 28 but are then all transported on the same path onto the roller table 36 so that they can be picked up by the passenger at the location 38.

Even when, for example, the passenger 14 takes somewhat longer to place his objects onto the roller table 22 for further transport in the direction toward the X-ray transfer lock 28, the passenger 16 must not wait until the passenger 14 is finished. Instead, he can simultaneously place the objects that he carries at the location 20 onto the roller table 40 from where the objects are transported to the X-ray transfer lock 28 and then through the X-ray transfer lock 28. The waiting period can thus be effectively used without requiring a further X-ray transfer lock 28. The objects which have been placed by the two passengers 14 and 16 onto the roller tables 22 and 40, respectively, are transferred sequentially by the switch-like structure of the two transport paths of the transport devices 22, 24; 40, 42, 44, 46, 48; 26 to the X-ray transfer lock 28 without this resulting in the objects backing up or causing a jam etc.

After placing the objects onto the roller table 22, respectively, 40, the two passengers 14 and 16 pass through the metal detector gate 50 and move to the location 38 where they can collect the respective objects from the roller table 36. Picking up the objects is carried out, as practical experience has shown, substantially faster than the previous placement onto the roller tables 22 and 40 so that no further appreciable waiting period or delay results.

The features of the invention disclosed in the above description, the claims, as well as the drawing can be important individually as well as in any suitable combination for the realization of the invention in its different embodiments.

While specific embodiments of the invention have been shown and described in detail to illustrate the inventive principles, it will be understood that the invention may be embodied otherwise without departing from such principles.

What is claimed is:

1. A device for security checking objects carried by persons entering an enclosed area, the device comprising:
    a security checking area;
    a first transport device configured to transport objects from a first location outside the security checking area into the security checking area;
    a second transport device configured to transport objects from a second location outside the security checking area into the security checking area, wherein the second location is not the first location.

2. The device according to claim 1, wherein the first and second transport devices have a portion that is common to both the first and second transport devices.

3. The device according to claim 1, wherein the first and second transport devices are oriented relative to one another to form a switch.

4. The device according to claim 1, further comprising a third transport device configured to transport the objects out of the security checking area.

5. The device according to claim 4, wherein the third transport device is configured to transport the objects to a third location positioned outside the security checking area, wherein the third location is not the first location or the second location.

6. The device according to claim 4, wherein the security checking area is a transfer lock and wherein the first and second locations are located upstream of the transfer lock in a transport direction of the objects and the third location is positioned downstream of the transfer lock in the transport direction of the objects.

7. The device according to claim 4, wherein at least one of the first, second, and third transport devices comprises rollers configured to rotate about a horizontal axis and configured to moveably carry the objects placed onto the rollers in the transport direction.

8. The device according to claim 1, wherein the security checking area comprises an X-ray device.

9. The device according to claim 1, wherein at least a portion positioned within the security checking area of at least one of the first, second, and third transport devices is motor-driven.

10. The device according to claim 9, wherein the motor-driven portion comprises a transport belt.

* * * * *